July 14, 1953     D. J. DURAND     2,645,505
COMBINATION MOTHER'S PULL AND BRAKE
ARRANGEMENT FOR TRICYCLES
Filed April 3, 1952
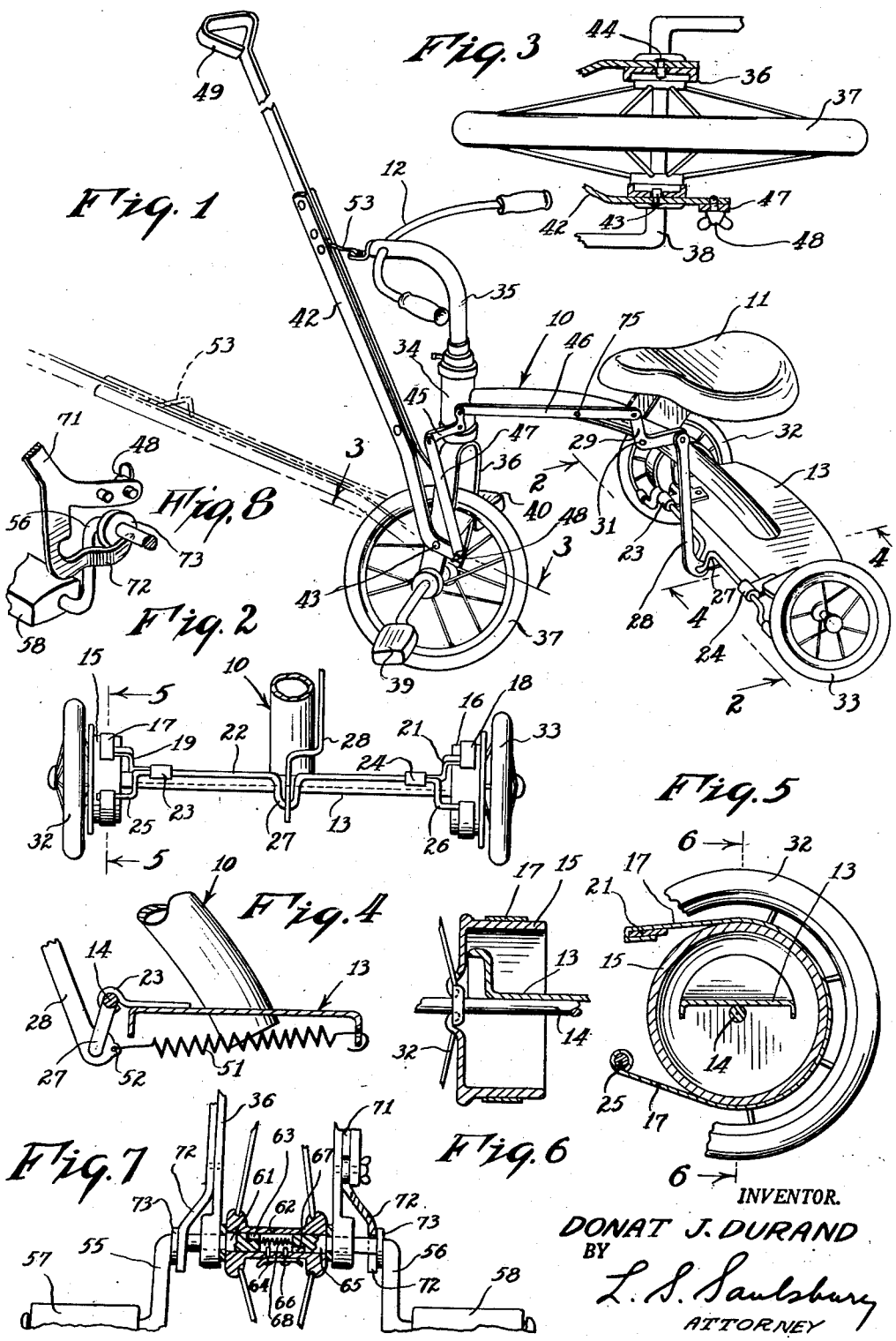
INVENTOR.
DONAT J. DURAND
BY
L. S. Saulsbury
ATTORNEY Patented July 14, 1953

2,645,505

UNITED STATES PATENT OFFICE 2,645,505

COMBINATION MOTHER'S PULL AND BRAKE ARRANGEMENT FOR TRICYCLES

Donat J. Durand, Bluefield, W. Va.

Application April 3, 1952, Serial No. 280,295

2 Claims. (Cl. 280—210)

This invention relates to tricycles and more particularly to a combination mother's pull and brake arrangement therefor.

The principal object of the invention is to provide on a tricycle a pull tongue or bar which can be released from the handle bars and which is connected to a brake arrangement on the rear wheels so that automatically as the pull bar is released the brakes are released so that pulling can be effected with the pull bar as it is lowered or as it is lifted the brakes can be applied.

It is another object of the invention to provide a connection of the foot pedal arms with the forward drive wheel such that the arms can be released from the wheel at times when the child is too tired to operate the pedals so that these pedals serve merely as a foot rest and both of which hang downwardly to give equal leg length and wherein the release of the pedal arms can be effected automatically by the pull bar as it is swung downwardly and at the same time the brakes are released and to again connect the pedal arms when the pull bar is raised to set the brakes.

It is another object to provide in a pull bar brake combination for tricycles a simple means for the connection of the pull bar element with the brake operating parts and for the fixing of the operating parts to the tricycle body to keep them from interfering with the child when the tricycle is used by the child himself and without the pull bar.

Other objects of the invention are to provide a combination pull bar, brake and forward wheel release having the above objects in mind which is of simple construction, inexpensive to manufacture, has a minimum number of parts, easy to install upon the tricycle, consumes minimum space and easy and efficient in operation.

For other objects and for a better understanding of the invention reference may be had to the following detailed description taken in connection with the accompanying drawing, in which Fig. 1 is a perspective view of a tricycle and of the combination pull bar and brake arrangement embodying the features of the present invention connected thereto, Fig. 2 is a sectional view of the tricycle looking upon the brake operating parts at the rear of the tricycle and taken on line 2—2 of Fig. 1, Fig. 3 is a sectional view of the tricycle and of the arrangement as viewed on lines 3—3 of Fig. 1, Fig. 4 is a sectional view taken on line 4—4 of Fig. 1, Fig. 5 is an enlarged vertical sectional view taken through one of the brake drums and on line 5—5 of Fig. 2, Fig. 6 is a partial vertical sectional view taken on line 6—6 of Fig. 5, Fig. 7 is a fragmentary and sectional view of a front drive wheel construction showing separable pedal arms to release them from their driving connection with the wheel so that they may serve as a rest and constructed to a modified form of the invention;

Fig. 8 is a fragmentary perspective view of the arrangement shown in Fig. 7 in which a cam is provided on the pull arm to effect automatically as the pull arm is moved down the separation of the pedal arms.

Referring now particularly to Figs. 1 to 6, 10 represents generally the frame of a tricycle having a seat 11 and a handle bar 12. The rear of the frame has a platform 13 to which there is connected a transversely extending axle 14 which may be rigidly secured thereto by welding. This axle carries on the opposite ends thereof opposingly arranged brake drums 15 and 16 having respectively external braking surfaces and over which there extends respectively brake bands 17 and 18. These bands are rigidly anchored respectively to the platform by brackets 19 and 21. A double crankshaft 22 is journalled in bearing elements 23 and 24 and its respective crank arms 25 and 26 are fixed to the free ends of the bands 17 and 18 so that as the shaft 22 is turned, the bands will be tightened or loosened. Centrally of the shaft 22 is a bent arm portion 27 which is connected by a link 28 to a bell crank 29 that is pivoted at 31 on the bicycle frame 10 at a location beneath the seat 11. Rear wheels 32 and 33 are respectively journalled upon the shaft 14.

The forward end of the frame 10 has a vertical sleeve portion 34 into which handle bar shaft 35 extends for connection with a front wheel yoke 36 in which the front large drive wheel 37 is journalled.

A pedal crank 38 is fixed to the wheel 37 and has pedals 39 and 40 on the opposite ends thereof.

A pull arm by which the mother can pull the tricycle is indicated at 42 and has forked portions extending on the opposite sides of the depending yoke 36 and these portions are respectively pivotally connected thereto by pins 43 and 44.

The forward vertical sleeve 34 of the frame 10 has a bell crank 45 pivotally connected thereto, one end of which is connected by a link 46 with the bell crank 29. The link 47 is connected between the bell crank 45 and is pivotally connected to an extension of the draw pull arm or bar 42 by a thumb screw 48. The pull bar 42 has a long tension spring 51 which is connected between the platform 13 at the rear end thereof as shown in Fig. 4 and the depending link 28, as indicated at 52. This spring tends to hold the crank shaft turned to normally effect braking action upon the two wheel brakes. When the draw pull bar 42 is lifted and is fastened to the handle bars as by a hook 53 the spring 51 will tend to hold the brake bands in a position to effect braking action upon the wheels 32 and 33. As the pull handle 42 is released from the handle bars by a release of the hook 53 and pivoted downwardly to a dotted line position as shown in Fig. 1, the brake bands 17 and 18 will be automatically released so that the wheels will be free to permit easy pulling of the tricycle over the ground.

In Figs. 7 and 8 there is shown a modified form of the invention wherein the draw pull handle 42 can serve to separate the pedals on the front wheel and release them for use as a foot rest for the child. According to this form of the invention separable pedal crank arms 55 and 56 having respectively foot pedals 57 and 58 are journalled on the lower end of the forked member 36. The arm 55 has an enlarged diameter portion 61 on which wheel hub 62 is journalled. This portion has a slot 63 in the end thereof for receiving a pin 64 in the hub. The arm 56 has an enlarged end 65 for receiving pin 66 in its slot 67. A spring 68 is connected between the ends of the arms 55 and 56 and normally urge the ends of the arms together with the pins 64 and 66 lying in the slots 63 and 67 respectively.

The draw pull arm 71 is pivotally connected to the fork 36 by portions of the arm extending downwardly on the opposite sides of the fork and fixed to the fork by a pin projecting from the arm 71 coacting with the fork 36 similar to pin 43 illustrated in Fig. 1. Each of the portions of the draw pull bar 71 has a cam projection 72 adapted to bear against the circular formation 73 on the crank arm. Accordingly as the draw pull bar 42 is brought down, the cam projections 72 of the draw pull arm will bear against the circular formations to separate the cranks 55 and 56 to assume the positions shown in Fig. 7. As the draw pull arm is raised, however, the cam projections 72 will be removed from the formation 73 so that the crank arms 55 and 56 will be drawn inwardly by the spring 68 to lock the respective cranks with the pins 64 and 66 on the hub 62 of the wheel 37. The link 47 is connected to this draw pull arm 71 by means of a thumb screw 48 in the same manner as above described.

If it is desired to remove the draw bar 42, the same can be easily done by separating the forked formation thereof and the link 47 from the end of one of the forked extensions. The thumb screw 48 then can be fastened into a threaded opening 75 in the link 46. The link 47 having been swung upwardly to register the thumb screw 48 with the opening 75.

It will thus be seen that there has been provided a combination pull bar and brake arrangement whereby automatically as the draw pull bar is elevated and fastened to the handle bar, the brakes will be operated, and also as the draw bar is raised while the tricycle is pulled with it, the braking action can be effected, and when the draw bar is down the brakes are automatically released. It will be seen that with the combination that the drive pedals can be automatically adjusted according to the form of the invention shown in Figs. 7 and 8 so as to serve as a foot rest for the child while the tricycle is being pulled and when the draw bar is raised to a raised position, the foot pedals will then become engaged with the drive wheel, and the child can drive the tricycle through the means of the drive wheel. This is also effected when the draw bar is removed from the tricycle and the link 47 raised to an elevated position upon the link 46 with the thumb screw 48 in the threaded hole 75.

While various changes may be made in the detail construction, it shall be understood that such changes shall be within the spirit and scope of the present invention as defined by the appended claims.

What is claimed is:

1. In combination, a tricycle having a frame, a platform connected to the rear of the frame, an axle connected to the platform, brake devices carried by the axle, crank and linkage means connected to the brake devices and extending forwardly over the frame of the tricycle and having elements thereon pivotally connected to the frame, a steering wheel fork pivoted upon the frame, a drive wheel journalled upon the fork, handle means, pedal crank means connected to the drive wheel, a draw pull bar pivotally connected to the drive wheel fork, said linkage means pivotally connected to the draw pull bar to be operated by the same, said linkage operable by the pull bar when the pull bar is lifted to actuate the pull devices and when the pull bar is lowered to free the devices and allow free rotation of the rear wheels, and said crank pedals on the drive wheel comprising separable pedal crank arms, spring means urging said arms toward one another, drive pin connections for releasably connecting said arms with the drive wheel hub and means upon the draw pull arm and engageable with the pedal crank arms to release the pedal crank arms upon the draw pull handle being lowered to a pulling position.

2. In combination, a tricycle, brake means mounted on said tricycle and operable between braking and released positions thereof, a draw pull bar pivotally connected to the tricycle at the forward end thereof, said brake means connected to the draw pull bar and operable thereby as the draw pull bar is moved up and down, a drive wheel connected to the forward end of the tricycle and separable pedal arms extending into the drive wheel and axially adjustable relative to each other, means extending between the wheel and the separable pedal arms to releasably hold the respective arms in driving relationship with the wheel and means extending between the draw pull bar and the separable pedal arms to release the pedal arms from the wheel as the draw pull bar is lowered from the tricycle.

DONAT J. DURAND.

References Cited in the file of this patent
UNITED STATES PATENTS

| Number | Name | Date |
|---|---|---|
| 1,313,470 | Discher | Aug. 19, 1919 |
| 1,710,849 | Watson | Apr. 30, 1929 |
| 1,933,955 | Arnold | Nov. 7, 1933 |
| 2,335,583 | Conti | Nov. 30, 1943 |